Aug. 23, 1932.   H. LUCE   1,872,992
MACHINE FOR PRODUCING SLITS IN TYPE BARS
Filed Jan. 25, 1930   4 Sheets-Sheet 2

INVENTOR:
Hans Luce
BY Lorra & Kehlenbeck
ATTORNEYS

Aug. 23, 1932.  H. LUCE  1,872,992
MACHINE FOR PRODUCING SLITS IN TYPE BARS
Filed Jan. 25, 1930  4 Sheets-Sheet 3
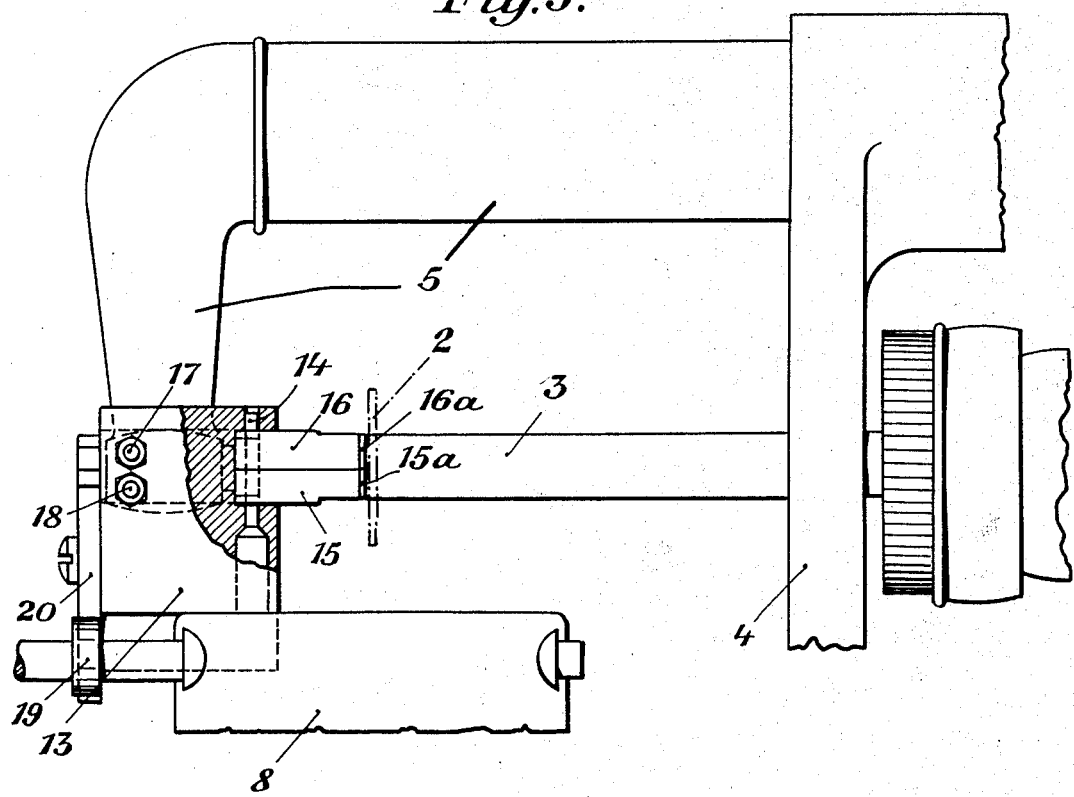
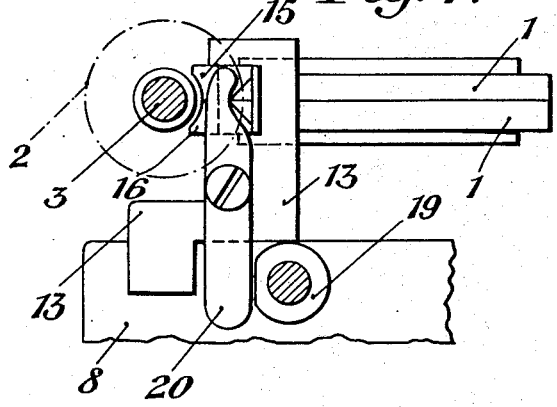
INVENTOR:
Hans Luce
BY Lotka & Kehlenbeck
ATTORNEYS

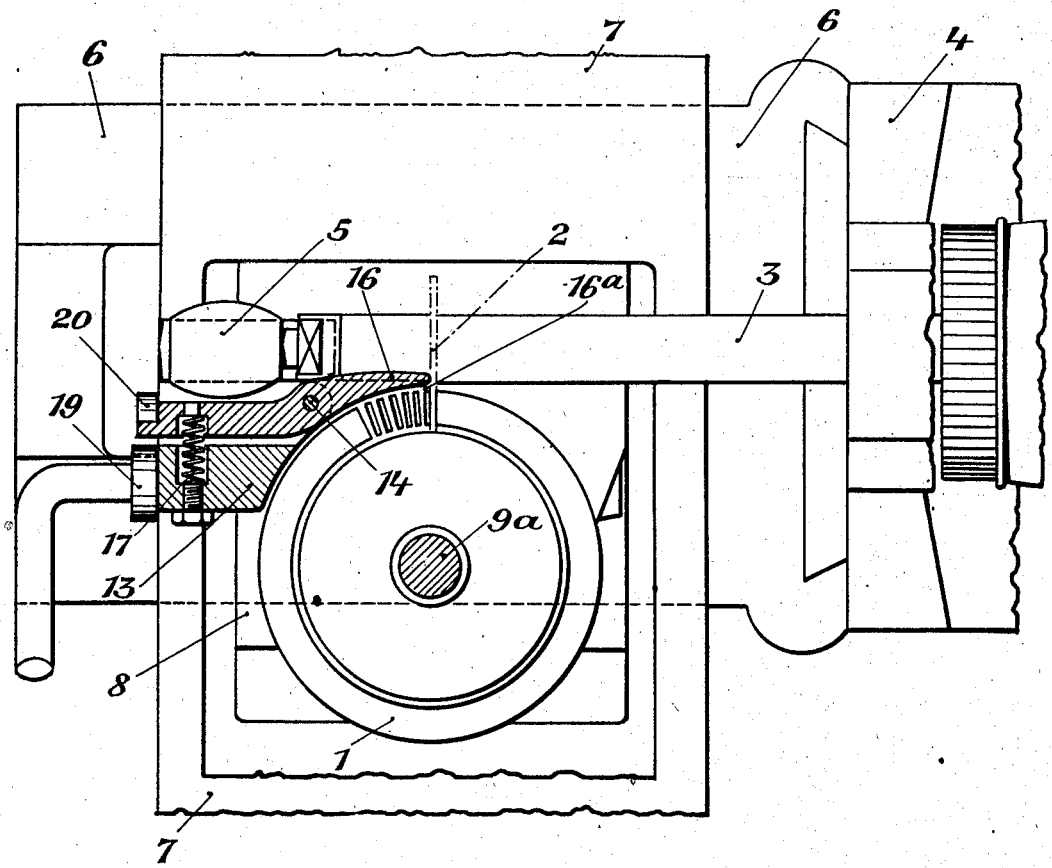

Patented Aug. 23, 1932

1,872,992

UNITED STATES PATENT OFFICE

HANS LUCE, OF SOMMERDA, GERMANY, ASSIGNOR TO RHEINISCHE METALLWAAREN-UND MASCHINENFABRIK SOMMERDA AKTIENGESELLSCHAFT, OF SOMMERDA, GERMANY, A CORPORATION OF GERMANY

MACHINE FOR PRODUCING SLITS IN TYPE BARS

Application filed January 25, 1930, Serial No. 423,302, and in Germany April 12, 1929.

My invention relates to a method and machine for cutting slits in blanks, and has been devised particularly for the manufacture of type bar segments such as are used in typewriters and similar machines. Such segments have a plurality of radial slits, and the present practice is to produce such slits successively, one by one. Considerable difficulty has been experienced owing to the fact that the narrow portions or tongues of material which remain between successive slits are relatively weak and therefore liable to yield when the next slit is being cut. These tongues will during the cutting of a slit, tend to bend laterally toward the previously slitted portion or side of the blank. Even the tool employed, which has generally been a suitable saw or milling cutter of relatively small thickness, is liable to deviate from the radial direction which it is intended to preserve, and to become distorted or bent toward that side on which the resistance is least, that is to say toward the previously slitted portion of the blank. These circumstances cause inaccuracies in the direction of the slits and in the shape of the tongues. Such inaccuracies of course are troublesome in the assembly of the slitted blank and of the parts, such as the type bars, to be connected therewith, and also in the proper final adjustment of the parts.

My present invention overcomes the difficulties of the prior art by providing a method and a machine according to which lateral deflection of the tongues is prevented in a novel manner by means of holders of special arrangement and movement which during the cutting operation are in firm engagement with the face of the blank as distinguished from the sides of the tongues.

Figure 1:
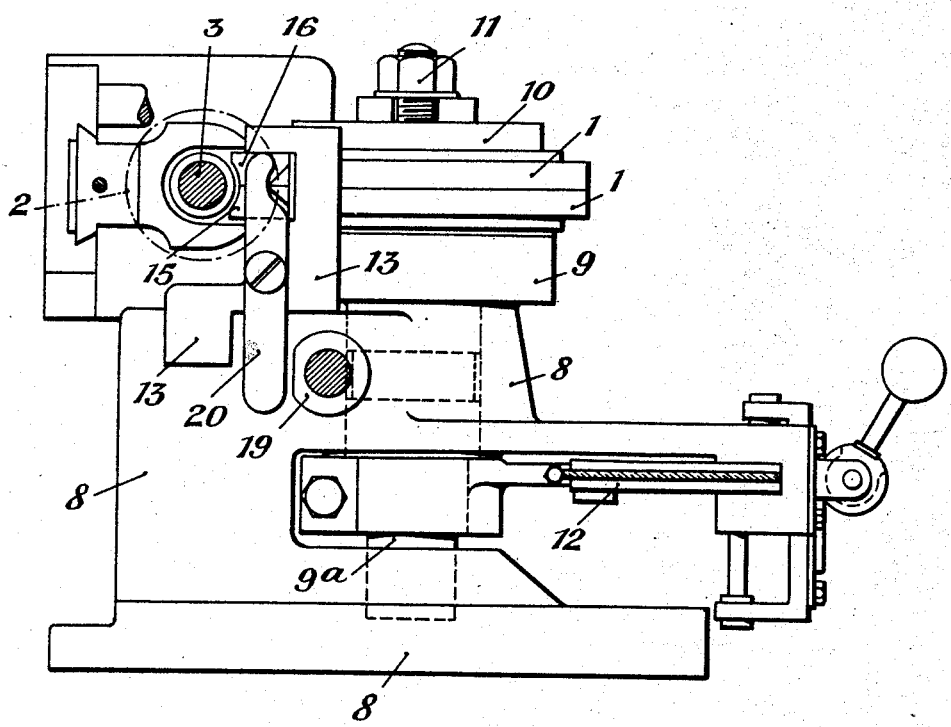
Figure 2:
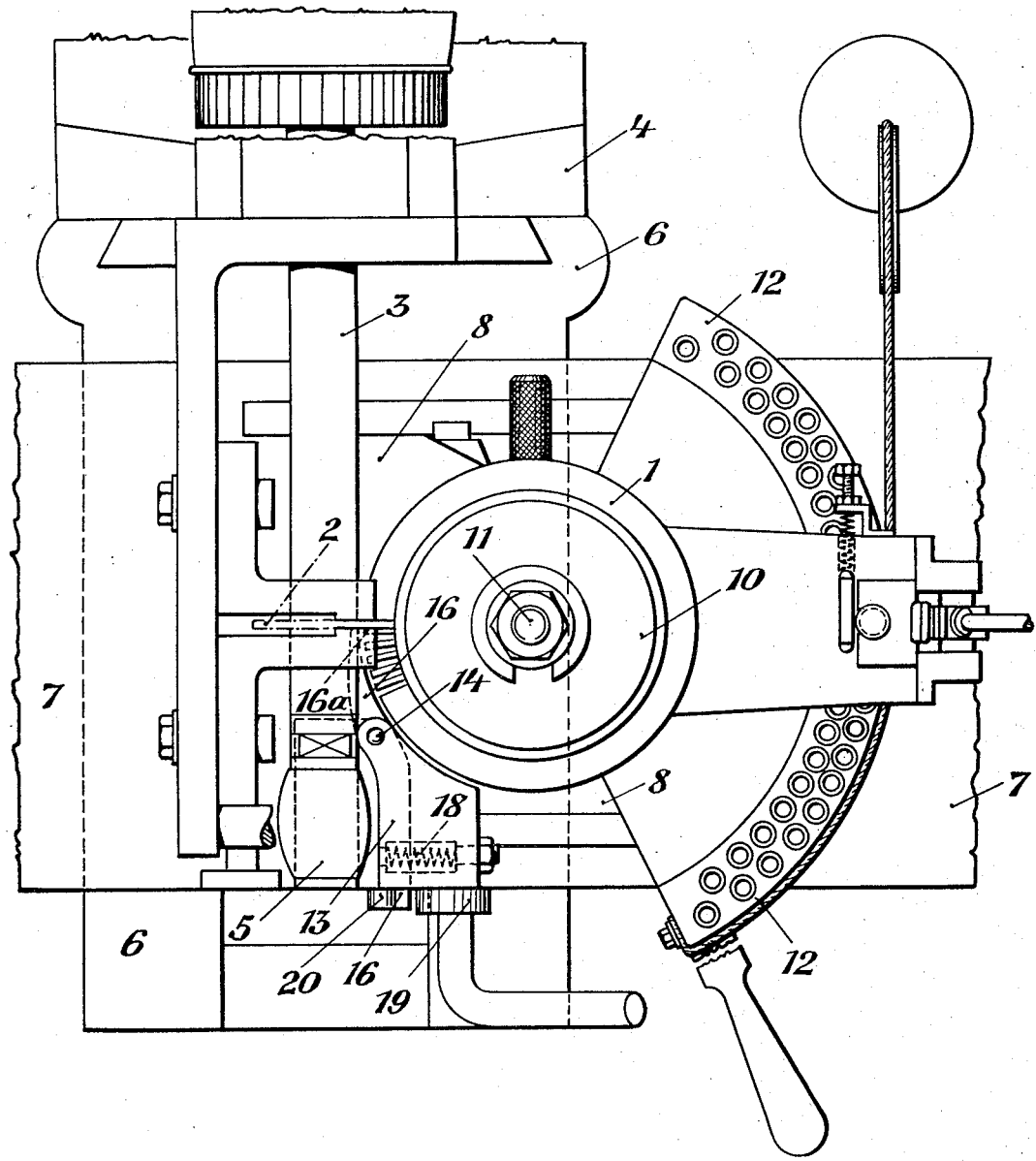

Without desiring to restrict myself to the particular embodiment illustrated, I will now describe a satisfactory and preferred form of a machine embodying my invention, as shown in the accompanying drawings, in which Fig. 1 is a side elevation of such machine with parts in section; Fig. 2 is a plan view thereof; Fig. 3 is a partial front elevation; Fig. 4 is a side elevation of the parts shown at the lower portion of Fig. 3, looking from the left, and Fig. 5 is a partial plan view with parts in section, Figs. 3, 4 and 5 illustrating the construction and the action of the holder.

The machine illustrated is intended to produce slits simultaneously in two circular or cylindrical blanks 1 which are secured one on top of the other. The radial slits are produced in said blanks by means of a circular saw or milling cutter 2 rigidly mounted on a shaft 3 which at one end is supported in a bearing 4 while the other end is supported at the lower end of an arm 5. The vertically movable table of the milling machine is indicated at 6, and its cross slide at 7.

Upon the cross slide 7 is secured a carrier 8 in which the support or turn table 9 is journalled to rotate about a vertical axis as indicated at $9^a$. The blanks 1 are clamped to said support by means of a pressure plate 10 and nuts 11. With the shaft $9^a$ is also rigidly connected the indexing plate 12 connected with suitable indexing mechanism, which may be of any well known or approved type and therefore need not be described herein. It will be understood that the indexing plate 12 and the support 9 will rotate in unison with each other and with the blanks 1.

Immediately adjacent to the rotary support 9 the carrier 8 is provided with a bracket 13 provided with a vertical pivot 14 on which are mounted to swing the two superposed levers or holders 15, 16, provided with pressure ribs $15^a$, $16^a$ respectively each adapted to engage one of the superposed blanks 1. The pressure ribs are so located as to be adjacent to the plane in which the tool 2 operates, and as shown best in Fig. 5 these ribs will engage the face of the blank at the tongue which is adjacent to the cutter 2 and which therefore requires bracing against lateral deflection. Springs 17, 18 interposed between the bracket 13 and holders 16, 15 respectively, serve to press the ribs $15^a$, $16^a$ of said holders against the face of the blank at the said tongue, with a force which will produce a sufficient friction to prevent any lateral bending or deformation of the tongue produced by the cutting tool. It will be understood that the cutting tool is fed inwardly, toward the center of the segment blank, in any usual or approved manner. When the cut has been completed to the proper depth, the cutter is moved out of contact with the blank and at the same time the holders 15, 16 are moved out of contact with the blank, which may be effected, for instance, by means of an eccentric or cam 19 adapted to engage a lever 20 which engages the said holders 15, 16. The cam will operate against the action of the springs 17, 18 to remove the tongues 15, 16 from contact with the face of the blank, thereby releasing the blank for the partial rotation or so called indexing movement required to bring it into proper position for the next cut. It will be noted that the holders 15 and 16 engage the blanks 1 on the same face as that at which the saw or cutter 2 begins to cut, and that the said holders are movable toward and from the said face of the blank in the direction of the depth of the cut or slit. In this way, the blank, and particularly the tongue which is formed between two successive cuts or slits, is held rigidly against lateral deflection, by a pressure which is exerted lengthwise of the tongue. The holders engage the blank quite close to the plane in which the cutter works, and therefore brace the blank, and particularly the tongue mentioned above, immediately adjacent to the cutter. In my invention, the spacing of the tongues is immaterial, and in this respect my invention offers considerable advantages over such devices of the prior art which employ a bracing or steadying member projecting into one of the slits. Obviously, this prior construction is applicable only when the slits are equally spaced and of equal width, and even then it does not support the tongues as securely as my improved holders. It will be understood that the indexing movement whereby the cutter 2 is brought into co-operative relation to an uncut portion of the blanks 1 (for the production of the next slit), takes place in a direction from the cutter 2 toward the holders 15, 16, which is the contraclockwise direction in Fig. 5. In other words, the holders 15, 16, or at least their ribs or active portions 15a, 16a, are arranged in advance of the cutter, with respect to the direction of the indexing movement, so that said active portions 15a, 16a will engage the tongues lying between the slit in process of being cut and the adjacent previously cut slit.

While the invention is intended primarily for the cutting of slits in blanks for type bar segments of typewriting machines, it will be obvious that the same method and means of the same character may be employed wherever slits are to be produced in a blank of metal or other material which is liable to be deformed laterally during the slit-cutting operation.

I claim:

1. A machine for producing radial slits in the circularly-curved face of a blank, comprising a support for the blank, a device mounted to rotate in a plane containing the axis of said circularly-curved face of the blank and to cut radial slits in said blank, and a holder arranged to engage the said face of the blank immediately adjacent to the portion at which the cutting device begins its slitting operation, said holder being pivoted about an axis parallel to said axis of the circularly-curved face of the blank.

2. In a device for producing in the rim face of a metal platen, successively one by one, a plurality of narrow spaced slits between which thin tongues of material are formed, which during the cutting of a slit tend to bend toward the previously slitted portion of the blank, the combination of a cutter which, corresponding to the small width of the slits, is of small thickness and therefore liable to deviate from the intended direction of the slits, that is, from the direction of the feed movement of the tool relatively to the blank, and a holder arranged to engage the rim face of the blank adjacent to the portion engaged by the slit cutter, said holder being movable toward and from said face in the direction of the feed movement of the tool relatively to the blank but rigid against lateral movement, said holder being pressed against the rim face of the tongue of material formed between the slit in process of being cut and the adjacent previously cut slit.

3. A machine for slitting blanks, comprising a support for the blank, a device for cutting slits in the blank by causing such device to engage the blank first at the edge and then by a feed movement penetrate into the blank to the desired depth of the slit, means for effecting a relative indexing movement in a predetermined direction, between blank and cutting device while they are out of engagement with each other, to bring said device into registry with an uncut blank portion preparatory to the cutting of another slit, and a holder arranged to exert pressure against the edge of the blank adjacent to the cutting device, in a direction parallel to the depth of the adjacent slit, at a point located in advance of said device, with respect to the direction of said relative indexing movement, so that such holder will engage the edge of the blank on that side of the cutting device on which the previously cut slit is situated.

4. A machine for slitting blanks, comprising a support for the blank, a device for cutting slits in the blank by causing such device to engage the blank first at the edge and then by a feed movement penetrate into the blank to the desired distance from said edge, means for effecting a relative indexing movement, in a predetermined direction transverse to the blank-penetrating feed movement, between blank and cutting device while they are out of engagement with each other, to bring said device into registry with an uncut blank portion preparatory to the cutting of another slit, a holder arranged to engage the edge of the blank adjacent to the cutting device, at a point located in advance of said device, with respect to the direction of said relative indexing movement, so that said holder is adapted to engage the edge of the blank on that side of the cutting device on which the previously cut slit is situated, and elastic means for pressing said holder against said edge in a direction transverse to said edge, to brace the portion of the blank situated between the slit being cut and the previously cut slit.

5. A machine for slitting blanks, comprising a support for the blank, a device for cutting slits in the blank by causing such device to engage the blank first at the edge and then by a feed movement penetrate into the blank to the desired distance from said edge, and a holder arranged to exert pressure against the edge of the blank adjacent to the cutting device, in a direction transverse to said edge, to brace the portion of the blank weakened by the previously cut slit.

6. A machine for slitting blanks, comprising a support for the blank, a device for cutting slits in the blank by causing such device to engage the blank first at the edge and then by a feed movement penetrate into the blank to the desired distance from said edge, a holder arranged to engage the edge of the blank adjacent to the cutting device, and elastic means for pressing said holder against said edge, in a direction transverse to said edge, to brace the portion of the blank weakened by the previously cut slit.

7. A machine for slitting blanks, comprising a support for the blank, a device for cutting slits in the blank by causing such device to engage the blank first at the edge and then by a feed movement penetrate into the blank to the desired distance from said edge, a holder having a portion movable into and out of engagement with the edge of the blank, transversely to said edge, at a point adjacent to said cutting device, elastic means for pressing said holder portion against said edge, and means for moving said holder portion away from said edge.

8. A machine for slitting blanks, comprising a support for the blank, a device for cutting slits in the blank by causing such device to engage the blank first at the edge and then by a feed movement penetrate into the blank to the desired distance from said edge, a holder having a portion arranged to exert pressure against the edge of the blank adjacent to the cutting device, in a direction transverse to said edge, and means for moving said holder portion out of contact with said edge.

9. A machine for slitting blanks comprising a support for the blank, a device for cutting slits in the blank by causing such device to engage the blank first at the edge and then by a feed movement penetrate into the blank to the desired distance from said edge, a holder arranged to engage the edge of the blank adjacent to the cutting device, and a spring for urging said holder against said edge, in a direction transverse to said edge, with a pressure which is insufficient to deform the tongue of material produced by the cutting operation, but strong enough to produce, between the holder and said edge of the blank, an amount of friction sufficient to brace said tongue against lateral deflection or deformation.

In testimony whereof I have hereunto set my hand.

HANS LUCE.